United States Patent [19]

Hogan et al.

[11] 4,376,851
[45] Mar. 15, 1983

[54] SOLID POLYMERS OF OLEFINS AND PRODUCTION OF SUCH POLYMERS

[75] Inventors: John P. Hogan; Robert L. Banks, both of Bartlesville, Okla.

[73] Assignee: Phillips Petroleum Company, Bartlesville, Okla.

[21] Appl. No.: 558,530

[22] Filed: Jan. 11, 1956

Related U.S. Application Data

[63] Continuation-in-part of Ser. No. 333,576, Jan. 27, 1953, abandoned, and Ser. No. 476,306, Dec. 20, 1954, abandoned.

[51] Int. Cl.$^3$ .......................................... C08F 110/06
[52] U.S. Cl. .................................................. 526/351
[58] Field of Search ........................ 260/93.7; 526/351

[56] References Cited

U.S. PATENT DOCUMENTS

| | | | |
|---|---|---|---|
| 2,085,524 | 6/1937 | Simo et al. | 526/237 |
| 2,291,510 | 7/1942 | Thomas | 526/339 |
| 2,381,481 | 8/1945 | Anderson | 585/525 |
| 2,387,784 | 10/1945 | Thomas et al. | 585/530 |
| 2,396,785 | 3/1946 | Hanford | 526/227 |
| 2,474,670 | 6/1949 | Hersberger et al. | 526/237 |
| 2,477,018 | 7/1949 | Thomas et al. | 526/339 |
| 2,478,066 | 8/1949 | Van Peski | 526/220 |
| 2,525,787 | 10/1950 | Fontana et al. | 585/18 |
| 2,542,610 | 2/1951 | Young | 526/347 |
| 2,571,354 | 10/1951 | Fontana et al. | 585/18 |
| 2,601,109 | 6/1952 | Fish | 524/404 |
| 2,691,647 | 10/1954 | Field et al. | 526/351 |
| 2,692,257 | 10/1954 | Zletz | 526/104 |
| 2,692,259 | 10/1954 | Peters | 526/104 |
| 2,700,663 | 1/1955 | Peters | 526/104 |
| 2,702,288 | 2/1955 | Hoeksema et al. | 526/100 |
| 2,726,231 | 12/1955 | Field et al. | 526/105 |
| 2,727,024 | 12/1955 | Field et al. | 526/95 |
| 2,728,735 | 12/1955 | Anderson | 524/479 |
| 2,728,754 | 12/1955 | Evering et al. | 526/69 |
| 2,728,758 | 12/1955 | Field et al. | 526/105 |
| 2,731,452 | 1/1956 | Field et al. | 526/105 |
| 2,731,453 | 1/1956 | Field et al. | 526/105 |
| 2,780,617 | 2/1957 | Zletz | 526/69 |
| 2,791,576 | 5/1957 | Field et al. | 526/105 |
| 2,826,620 | 3/1958 | Matuszak | 585/332 |
| 2,837,587 | 6/1958 | Hogan et al. | 585/251 |
| 3,112,300 | 11/1963 | Natta et al. | 526/351 |
| 3,112,301 | 11/1963 | Natta et al. | 526/351 |

FOREIGN PATENT DOCUMENTS 578992 7/1946 United Kingdom .
585396 2/1947 United Kingdom .
598323 2/1948 United Kingdom .

OTHER PUBLICATIONS

Natta et al. J. American Chem. Soc. 77, Mar. 20, 1955, pp. 1708-1710.
Natta Proceedings of the Fourth World Petroleum Congress, Sec. IVC, pp. 11 & 12.

Primary Examiner—Joseph L. Schofer
Attorney, Agent, or Firm—French, Hughes & Doescher

EXEMPLARY CLAIM

1. Normally solid polypropylene, consisting essentially of recurring propylene units, having a substantial crystalline polypropylene content.

1 Claim, 4 Drawing Figures

WAVE LENGTH, MICRONS

SOLID POLYMERS OF OLEFINS AND PRODUCTION OF SUCH POLYMERS

This application is a continuation-in-part of our co-pending applications Ser. Nos. 333,576 filed Jan. 27, 1953 and 476,306 filed Dec. 20, 1954, both now abandoned.

This invention relates to polymerization. In one aspect it relates to novel solid polymers having unique and desirable properties.

The production of solid polymers of olefins by the use of aluminum halide catalysts and by high pressure thermal or peroxide-catalyzed polymerization is known in the art. In the past, all known solid polymers of olefins have been considered equivalents of each other.

We have found that olefin polymers produced by certain processes are not equivalent to those produced by the prior art processes set forth above. We have also found that differences between different polymers are correlatable with the infrared absorption characteristics of such polymer and with X-ray diffraction data.

An object of this invention is to produce a novel polymer. Another object of the invention is to produce a solid polymer having unique and desirable properties. Another object is to produce a polymer which is resistant to deformation under the influence of heat. Another object is to produce a crystalline polymer. Another object is to produce a crystalline solid polymer from olefins having at least 3 carbon atoms per molecule. Other objects and advantages of the invention will be apparent to those skilled in the art from an inspection of the following disclosure.

According to this invention, there are provided crystalline, normally solid polymers of olefins having at least 3 carbon atoms per molecule. The polymers of this invention are further characterized by the regular recurrence within the molecule of certain atomic groupings, in contrast to more or less random grouping of atom groups within the molecule in prior art polymers. This characteristic is established by X-ray diffraction data. A further characteristic of polymers according to this invention is that they have relatively high densities as compared with the predominantly amorphous polymers produced by the prior art. Another characteristic of the polymers according to this invention is that they have relatively high melting points in comparison with prior art amorphous polymers. A further characteristic of polymers according to this invention is that they are insoluble in ordinary solvents such as methyl isobutyl ketone chloroform, carbon tetrachloride, symmetrical dichloroethane, benzene normal pentane, normal hexane and normal heptane at temperatures up to about the boiling points of these solvents at atmospheric pressure. Thus it will be apparent to those skilled in the art that the solid polymers of this invention are particularly useful where a heat-resistant polymer is desired. The polymers of this invention can be utilized for the preparation of molded articles such as containers for fluids and particularly containers such as bottles which are required to be sterilized by contact with steam at temperatures of the order of 212° to 230° F. The polymers can be extruded to form pipe and tubing, which can be used for the transfer of hot liquids or can be utilized to transfer liquids through relatively warm surroundings without deformation of the conduit. Polymers can also be extruded in the form of filaments which can be woven into textiles or films which are resistant to relatively high temperatures and can be used for packaging foods, drugs, etc. Films can also be formed from these polymers by molding or rolling. A further characteristic of polymers of this invention is their relative hardness. The value of this characteristic in connection with the uses mentioned above will be immediately clear to those skilled in the art.

Figure 1:
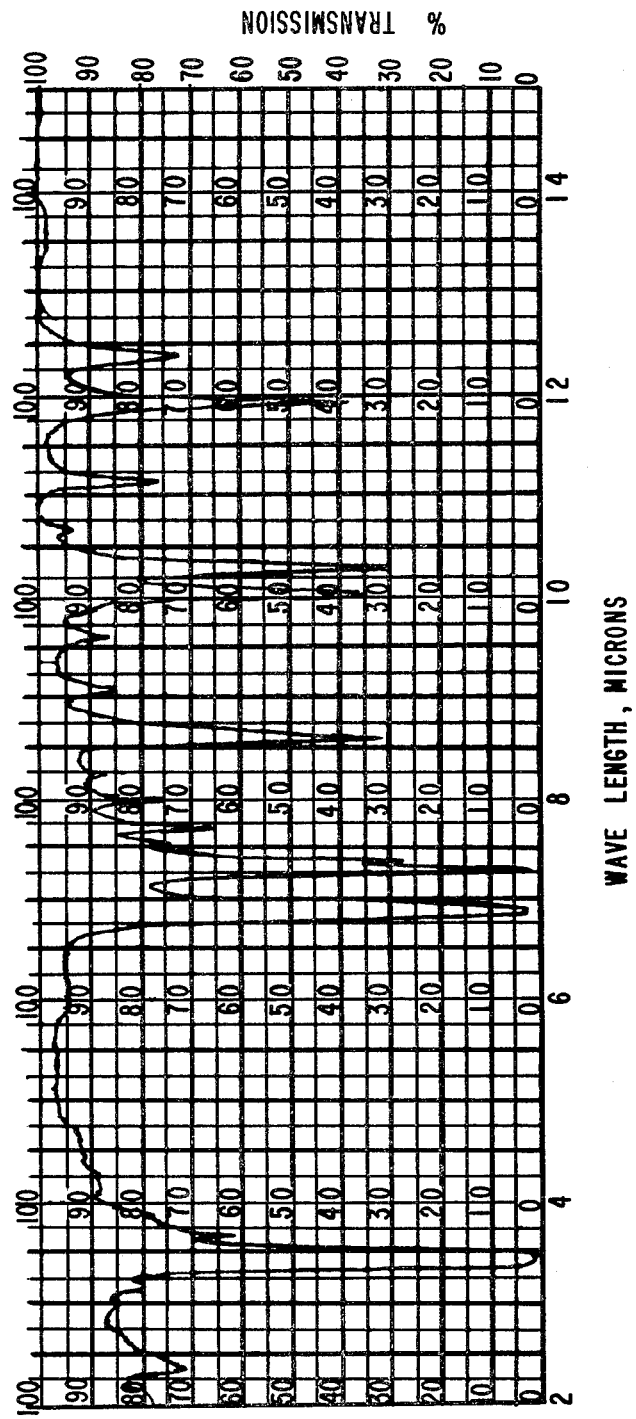
FIG. 1 is an infrared absorption spectrum of a polymer according to this invention.

The monomers which are used to produce the polymer according to this invention can be defined as olefins having at least 3 carbon atoms per molecule. A preferred class of these materials is defined as 1-olefins having at least 3 carbon atoms per molecule, a maximum chain length of 8 carbon atoms, and no branching nearer the double bond than the 4-position. A preferred class of olefin monomers according to this invention is defined as normal 1-olefins and methyl substituted 1-olefins having from 3 to 8 carbon atoms per molecule, the methyl substituent being no nearer the double bond than the 4-position. Examples of specific olefinic monomers are propylene, 1-butene, 1-pentene, 1-hexene, 4-methyl-1-pentene and 1-heptene.

The polymers according to this invention can be produced by contacting a monomer of the type above described, under polymerization conditions, with a catalyst comprising chromium oxide associated with at least one oxide selected from the group consisting of silica, alumina, zirconia and thoria. In this type of catalyst, chromium oxide is an essential ingredient, and it is much preferred that at least part of the chromium be in the hexavalent state. The existence of chromium in the hexavalent state can be determined by leaching the catalyst with water and determining the chromium dissolved in the leachings. The catalyst can be considered to be chromium oxide supported on one of the other oxides aforementioned. It appears however that the nonchromium component is not a mere inert support, since it appears that the nonchromium component contributes some of the activity of the composite catalyst. The foregoing characterization of the nonchromium component of the catalyst includes various mixtures or composites of the individual oxides mentioned. Thus the various compounds or composites known in the art as silica-alumina, silica-zirconia and silica-alumina-zirconia, as well as similar composites are within the scope of the foregoing catalyst description. Indeed one of the preferred nonchromium components of the catalyst is a silica-alumina composite of the type generally used as catalyst in the cracking art.

The chromium oxide catalyst can be prepared by impregnation of particulate silica, alumina, or silica-alumina, for example, with a solution of chromium oxide or a compound convertible to the oxide by calcination, followed by drying and activation of the composite at a temperature in the range of 450° to 1500° F. for a period of 3 to 10 hours or more. Activation is conducted by heating in a stream of gas. It is preferred that the gas contain oxygen and be substantially water-free. However, inert gases, such as carbon dioxide and nitrogen, can be used. It is found that within this activation range of temperature treatment of the catalyst, the character of the polymer can be controlled. When the catalyst is activated at temperatures in the upper part of the range, particularly from 1300° to 1500° F., the polymers obtained from propylene and heavier olefins have a lower average molecular weight and contain less tacky and solid polymer, while activation temperatures in the lower part of the range produce a catalyst which effects an increase in molecular weight of the polymer and the production of larger proportions of heavy tacky and solid polymer. The catalyst can be prepared using, as starting material, chromium trioxide, chromic nitrate, chromic acetate, chromic chloride, chromic sulfate, ammonium chromate, ammonium dichromate, or other soluble salts of chromium. The highest conversions were obtained from the catalyst that contained only chromium oxides after activation. Impregnation with chromium trioxide ($CrO_3$) is preferred, although chromic nitrate can be used with similar results. It is believed that the catalyst prepared from the chloride and that prepared from the sulfate are at least partially converted to oxide during activation. The amount of chromium, as chromium oxide, in the catalyst can range from 0.1 to 20 or more weight percent. Chromium contents as high as 50 weight percent are operative, but amounts above 20 weight percent appear to have little added advantage. A preferred non-chromium component or "support" is a silica-alumina composite containing a major proportion of silica and a minor proportion of alumina. While the method of preparing the silica-alumina composite undoubtedly affects the catalyst activity to some extent, it appears that silica-alumina composites prepared by any of the prior art processes for preparing such catalytically active composites are operative for the process of this invention. Coprecipitation and impregnation are examples of such processes. One support that has been found particularly effective is a coprecipitated 90 percent silica-10 percent alumina support. It is found that steam treatment of this support, i.e., silica-alumina, or silica without appreciable alumina, improves the activity and life of the catalyst composite in a polymerization reaction. A silica support of lower surface area and larger pore size is a better support than one having extremely high surface area and small pore size. These factors are believed to be of importance in the removal of the heavy polymer from the surface of the catalyst composite. A chromium oxide-alumina catalyst has about two-thirds the activity of a chromium oxide-silica-alumina catalyst. It is necessary for some of the chromium to be in the hexavalent state to act as an active promoter or catalyst for the polymerization reaction of this invention. It is preferred to use catalyst in which the amount of hexavalent chromium is at least 0.1 percent of the weight of the catalyst composite, as determined by ascertaining the water-soluble chromium present by leaching with water and determining the dissolved chromium in the leachings.

The preferred steam activation of the silica-alumina base of the catalyst is conducted at a temperature of approximately 1200° F. for 10 hours utilizing 5 volume percent steam admixed with 95 volume percent air. In the steam activation treatment, the temperature can be varied from 1100° to 1300° F. and the steam content of the steam-air mixture can range from about 3 to about 10 percent. The time of treatment can vary from about 4 to about 15 hours.

The molecular weight of the product can be changed by pretreating the catalyst base, preferably before addition of the chromium oxide, with a fluoride, alone or in aqueous or non-aqueous solution, e.g., aqueous or anhydrous hydrogen fluoride or other organic or inorganic fluoride, especially a volatile fluoride, and heating, e.g., at from 300° to 1100° F. for from 0.5 to 10 hours, to remove residual fluoride. This treatment results in a catalyst which, after addition of the chromium oxide, produces a polymer of increased molecular weight and flexibility. From 0.001 to 0.2 part by weight of fluoride per part by weight of oxide treated produces the improved results.

The terms "support" or "base", as used herein, are not to be narrowly interpreted. They are not limited to mere inert components of the catalyst mass. The non-chromium components appear to impart to the catalyst at least part of its activity, and variations in their identity and proportions affect the catalyst activity. The "support" is preferably utilized in porous form, e.g., a gel.

Other methods of preparing the catalyst, e.g., coprecipitation, are within the scope of the invention.

The temperature at which the polymerization is conducted is ordinarily within the range 100° to 450° F. However, these temperatures are not absolute limitations. The upper limit is ordinarily that temperature at which the hydrocarbon appears to deactivate the catalyst by some reaction other than polymerization, e.g. reduction, or that temperature at which depolymerization or cracking predominates over polymerization to the extent that no polymer is ultimately formed. The lower temperature limit is ordinarily determined by operating conditions such as viscosity and, in the case of fixed-bed operation, plugging of the catalyst bed by the deposition of heavy polymer therein. A preferred temperature range is from about 150° to about 375° F. and a more preferred range is from about 150° to about 275° F.

The reaction can be conducted in the liquid phase or in the gaseous phase, liquid phase operating ordinarily being preferred. It is often advantageous, particularly when operating in the liquid phase, to utilize a solvent or diluent in admixture with the olefin feed. This diluent should be one which can be maintained in the liquid phase under the reaction conditions and one which will not deleteriously affect the catalyst.

The pressure is preferably high enough to maintain the diluent in the liquid phase and to assure that olefins not liquefied under these conditions are dissolved in the liquid phase in sufficient amount. This often, but not invariably, requires a pressure of at least 100 to 300 psi, depending on the feed and the temperature, and a pressure of approximately 500 psi is to be preferred. The pressure can be as high as 700 psi or higher, if desired. It can be as low as atmospheric when, for example, the reaction is conducted in the gaseous phase. As a general rule, high pressures favor the production of high molecular weight polymers, all other conditions being constant. The feed rate can range from 0.1 to 20 liquid hourly space velocity with a preferred range of 1 to 6 liquid hourly space velocity in a liquid-phase process with fixed-bed catalyst. Hydrocarbon diluents, preferably paraffins and/or cycloparaffins, serve as solvents for the polymer products to aid in the removal of the product from the catalyst in the reactor. The diluents include aliphatic paraffins having from 3 to 12, preferably 5 to 12, carbon atoms per molecule. Any of the paraffins which is a solvent for the heavier polymer at temperatures in the operating range is suitable. Any hydrocarbon diluent which is relatively inert, non-deleterious, and liquid under the reaction conditions of the process can be utilized. Diluents that have been used successfully include propane, iso-butane, normal pentane, iso-pentane, isooctane (2,2,4-trimethylpentane), cyclohexane, and methylcyclohexane. The heavier paraffinic diluents gave better results than the lighter ones, probably because they are better solvents for the heavy polymer. Aromatic diluents are, in general, not used, since they appear to decrease the activity of the catalyst. They are, however, operative, where short catalyst life can be tolerated.

The polymerization can be effected with a fixed-bed catalyst or with a mobile catalyst. A frequently preferred method of conducting the polymerization reaction comprises contacting the feed olefin with a slurry of the comminuted chromium oxide catalyst in suspension in the solvent or diluent. The catalyst can be maintained in suspension by a mechanical agitation device and/or by virtue of the velocity of the incoming feed olefin. In this type of operation, a large portion of the product polymer remains associated with the catalyst, which is withdrawn from the reaction zone, as a slurry. The polymer is recovered by dissolution in a solvent of the type described, usually with the aid of heat and agitation, and the stripped catalyst is recycled and/or regenerated. The regeneration is accomplished by oxidizing the residual carbonaceous deposit with a controlled concentration of oxygen in an inert gas by conventional procedures. In order to remove polymer completely from the catalyst, a solvent other than that used as the diluent in the polymerization step can be utilized. Regardless of which solvent is used, it is ordinarily desirable to remove adhering solvent from the catalyst prior to any regeneration step. This can be done by stripping with an inert gas such as nitrogen or steam at a moderately elevated temperature.

One of the problems encountered in fixed-bed operation of the polymerization process of the invention lies in the plugging of the catalyst with heavy polymer. Periodically reversing the direction of flow of feed through the catalyst bed aids in distributing the heavy polymer over the catalyst and extends the time in which the catalyst can be utilized before regeneration is required. Effecting the process by countercurrently contacting a slowly gravitating bed of the catalyst with the liquid feed makes it possible to utilize the catalyst over longer periods of time before regeneration is necessary and entirely prevents plugging of the catalyst bed which eventually occurs in fixed-bed operation. The olefin-containing feed, together with a hydrocarbon solvent, such as n-pentane or isooctane, under sufficient pressure to maintain liquid phase, is charged into the bottom of the reactor and moved upwardly at a linear velocity which can be sufficient to give some expansion of the bed to prevent plugging by high polymer accumulation but insufficient to cause substantial top-to-bottom mixing of the catalyst. In this type of operation, it is possible to maintain a top bed temperature in the range of 100° to 150° F. and a bottom bed temperature in the same range, while the temperature of the middle section of the bed is maintained in the range of about 200° to 250° F. in propylene or higher 1-olefin polymerization. This type of operation and temperature control effects the production of a larger proportion of high molecular weight polymer in both the top and bottom sections of the bed and increases the yield of tacky and solid polymer. Temperature is controlled by regulating the temperature of the feed and the temperature of the incoming catalyst. The feed cools the hotter catalyst coming from the middle or intermediate section of the bed, and the cooler catalyst admitted to the top section of the bed cools the liquid passing into the top section of the bed from the hotter intermediate section. In the moving-bed process, the liquid feed rate is maintained in the range of 2 to 6 v/v/hr, the olefin concentration, in the hydrocarbon feed, in the range of 0.1 to 25 weight percent, and the catalyst rate in the range of 0.1 to 0.5 v/v/hr. In this process, fresh olefin-containing feed contacts the less active catalyst at a minimum temperature so that excessive reaction is avoided and heavier polymer is produced. The up-flowing feed is heated by direct heat exchange with hot catalyst from the higher temperature region produced by heat of reaction, and the temperature reaches a maximum at or near the middle of the bed. As the feed moves on up through the top part of the bed, it becomes more depleted in olefins and is cooled by direct heat exchange with cooler fresh catalyst. In the top part of the bed, the fresh, highly active catalyst contacts the olefin-depleted feed at or near the minimum temperature of the range so that excessive reaction is avoided and heavier polymer is produced. The effluent from the top of the reactor contains the total polymer (except polymer deposited on the catalyst), together with the hydrocarbon solvent, such as pentane or isooctane. Polymer remaining on the catalyst can be recovered, at least in part, by treatment of the catalyst with a suitable solvent, such as those previously described herein, at a temperature above reaction temperature, or by stripping the catalyst with an inert gas at a still higher temperature, e.g., 700° to as high as 1100° F. or higher, the effluent stripping gas being cooled to condense polymer removed therein. The polymer can be recovered from solution in the solvent by evaporation of the solvent. Operation with the temperature gradients indicated results in considerable reaction at lower temperatures than would otherwise be possible, and ultimately results in the production of heavier polymer. In addition, excessive reaction in a narrow zone with plugging difficulties and catalyst disintegration are avoided.

Used catalyst can be regenerated in auxiliary equipment in the usual manner. The catalyst is first washed with a hydrocarbon solvent, such as pentane or isooctane at a temperature in the range of 300° to 400° F. under sufficient pressure to maintain the solvent in the liquid phase. Following this, any remaining solid polymer is removed from the catalyst with dry air diluted with inert gas. The temperature at which the solid polymer is burned off the catalyst is maintained preferably in the range of 900° to 1100° F. Solid polymer is recovered from the solvent used in the washing step and the polymer-free solvent is reusable in subsequent washings.

As previously indicated, a preferred method of conducting the reaction is to maintain the catalyst, ordinarily in the form of a powder having a particle size in the range 20 to 100 mesh, in the form of a suspension in the diluent or solvent, and passing the monomer through this mixture. The suspension can be maintained by means of a mechanical stirrer and/or by means of the stirring action of incoming monomer. In this type of operation, a reaction time or residence time of the reaction mixture in the reaction zone can range from 5 or 10 minutes to 10 or more hours. Highly satisfactory results are obtained with a residence time in the range 30 minutes to 4 hours.

The total polymer is ordinarily recovered from the hydrocarbon effluent from the reactor by evaporation or vaporization of the solvent or diluent. However, the polymer can also be recovered by cooling the total effluent and precipitating the polymer therefrom as an insoluble precipitate. When a suspended catalyst is used, it is often desirable to remove the catalyst prior to the recovery of the polymer from the solvent. This can be effected by heating under pressure to dissolve a maximum amount of the polymer and subsequently removing the catalyst by the use of a filter or a centrifuge or equivalent equipment. However, in many cases only a few percent by weight of catalyst based on polymer produced is required, and in many cases less than one weight percent of the catalyst based on the weight of the polymer is utilized. Therefore in many cases, it is unnecessary to remove the catalyst from the product polymer. This is particularly true when the polymer is to be used for the production of such materials as pipes which are to be embedded in the earth or in various structures. The particular polymer according to this invention can be isolated or purified by extracting the total polymer with a solvent such as normal pentane, normal heptane or methyl isobutyl ketone to remove the more soluble portions. This extraction is ordinarily conducted at or a few degrees below the boiling point, ordinarily within 10 or 20 degrees Fahrenheit of the boiling point. The extract is decanted or otherwise removed and the remaining insoluble polymer can be heated, e.g., in vacuum to remove any adhering solvent.

Another method for producing polymers according to this invention is to utilize as catalyst a metallo organic compound such as an aluminum alkyl, or an aluminum alkyl halide in admixture with certain compounds of titanium, chromium or molybdenum or similar metals in the same or adjacent groups of the periodic table. An example of a catalyst of this type is a mixture of triethylaluminum with titanium tetrachloride. The general conditions of operation are similar to those previously described. An additional step in the procedure is that the effluent from the reactor is ordinarily treated with a compound such as a low boiling ketone or alcohol, e.g. methanol, to deactivate the catalyst. Ordinarily the catalyst residue is allowed to remain in the polymer which is produced. The reaction is ordinarily conducted in a reactor provided with a stirrer and is not ordinarily conducted by the fixed-bed technique.

The solid crystalline polypropylenes produced according to this invention have melting points in the range 230° to 320° F., densities in the range 0.90 to 0.96, intrinsic viscosities in the range 0.2 to 5.0, and weight average molecular weights in the range 900 to 50,000 and higher. The intrinsic viscosity is ordinarily determined by the use of a solution of 0.2 gram of the polymer in 50 cc of tetralin at 130° C. The weight average molecular weight is computed by multiplying this viscosity by 24,500. This type of molecular weight determination is described by Kemp and Peters, Ind. Eng. Chem. 35, 1108 (1943) and by Dienes and Klemm, J. Applied Phys. 17, 458 (June 1946).

We have produced crystalline polymers of 4-methyl-1-pentene which have melting points in the range 390° to 425° F.

EXAMPLE I

The catalyst used to produce the polymer was prepared by using as a base a silica-alumina coprecipitated composite gel containing 90 weight percent silica and 10 weight percent alumina. The gel had been treated with a mixture of steam and air at an elevated temperature for several hours prior to use. The gel, in the form of 14 to 28 mesh particles was impregnated with aqueous solution of chromium trinitrate nonahydrate (0.78 molar) dried and heated in dry air for about 5 hours at about 950° F. The final catalyst contained about 2 weight percent chromium as oxide, most of which was in the hexavalent state. 57.5 grams of this catalyst was charged to a reactor to form a fixed-bed of catalyst 16.5 inches deep and ¾ inches in diameter. A feed mixture comprising 9.12 weight percent propylene, 8.19 weight percent propane and 82.69 weight percent isopentane was passed through the catalyst bed at a temperature of 190° F., a pressure of 600 psig and a liquid hourly space velocity of 2. Total polymer was recovered from the effluent by vaporization of the isopentane and lighter materials. The duration of the run was approximately 5 hours. The total polymer was extracted first with chloroform and then with benzene, at a temperature slightly below the boiling point of each solvent, and the insoluble fraction was freed of adhering solvent by heating in vacuum.

The infrared absorption spectrum of this insoluble polymer is shown in FIG. 1, which is a plot of wave length of the infrared radiation against percent of transmission of light through the sample. The marked absorption at wave lengths of 3.4 and 6.8 microns are characteristic of all hydrocarbons and indicates the presence of C-H bonds. The marked absorption band at about 7.3 microns is characteristic of methyl groups. It will further be noted that there is marked absorption of infrared radiation at wave lengths of between 8.5 to 8.6 microns, between 10.0 and 10.1 microns, at approximately 10.3 microns, and approximately 11.9 microns. These marked absorption bands, especially those at about 8.6, about 10.0 and about 11.9 are characteristic of polymers of this invention and, to our knowledge, are not shown by other polymers produced prior to our production of the polymers herein described. It will be further noted that less marked, though definite, absorption bands appear at about 7.7, about 7.9 to 8.0, about 9.1, about 9.6, about 10.6 to 10.7 and at about 11.1 microns. These are also distinguishing characteristics of polymers according to this invention.

Figure 3:
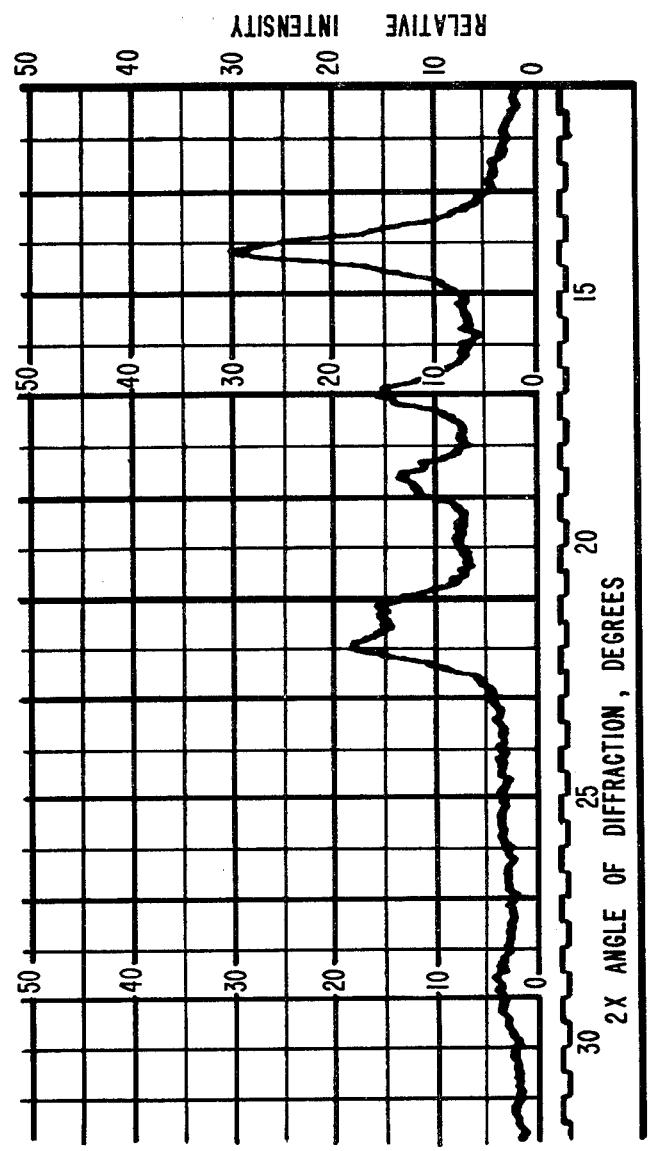
FIG. 3 is an X-ray diffraction pattern for the polymer, the spectrum of which is shown in FIG. 1.

From FIG. 1 it will be noted that the transmission minima are quite sharp, i.e. the slope of the curve on each side of the minima is quite steep. This phenomenon of sharp, V-shaped minima in the transmission curves shows that the material examined was highly crystalline, i.e. in excess of 80 percent crystallinity. Marked crystallinity is also shown by X-ray scattering curves of this polymer shown in FIG. 3. The X-ray scattering data also indicate the existence of regularly recurring groups of atoms within the molecule. Propylene polymer of this type has a melting point of the order of 290° to 305° F. In most cases, the melting point is at least 280° F.

Data in this example show that polymers according to this invention are highly crystalline and have infrared absorption characteristics which are characteristic of these and, to our knowledge, no other polymers.

EXAMPLE II

Propylene was polymerized in substantially the same manner as described in Example I except that the catalyst was prepared from silica-alumina having a particle size from 8 to 14 mesh, the final catalyst containing 4 weight percent chromium and the activation was conducted by heating in dry air at 730° F. Furthermore, the polymerization was conducted at 190° F. and 500 psig. The duration of this run was approximately 38 hours. Five and one-half pounds of total polymer was produced. A 2 inch diameter reactor was used.

The polymer was fractionated by extraction with methylisobutyl ketone. A first fraction was obtained which was insoluble in methylisobutyl ketone at 200° F. This fraction amounted to 5 percent of the total polymer. A second fraction which was insoluble in methylisobutyl ketone at 160° F. but soluble at 200° F. amounted to 7 percent of the total polymer. A third fraction which was insoluble in methylisobutyl ketone at 120° F. and soluble at 160° F. amounted to 12 percent of the total polymer. A further fraction of the polymer was obtained by treating the original total polymer with normal heptane at 120° F., recovering the heptane-insoluble fraction, dissolving this fraction in benzene, and reprecipitating by the addition of methyl alcohol. The fraction thus recovered was an extremely hard solid. This fraction and the three fractions previously described were analyzed by infrared spectral analysis and found to have spectra closely similar to that shown in FIG. 1.

1-Butene and 4-methyl-1-pentene can be polymerized in substantially the same manner as previously described and produce crystalline polymers. One sample of 4-methyl-1-pentene polymer thus obtained had a melting point of 394 to 421° F. A second similar polymer of 4-methyl-1-pentene produced in the same general manner had a melting point of 410° to 420° F.

EXAMPLE III

The catalyst of the type described in Example I was suspended in cyclohexane in a reactor provided with a motor-driven stirrer. Gaseous propylene was continuously pressured into the reactor to maintain a pressure from 80 to 340 psig. The temperature of polymerization was 180° F. and the duration of the run was 6 hours. The total amount of catalyst used was 10.2 grams and a yield of 9.3 grams of polymer per gram of catalyst was obtained. The fraction of the total polymer which was insoluble in cyclohexane at approximately 90° F. amounted to approximately 15.3 weight percent of the total polymer. This fraction had a density, at 25° C., of 0.936. This fraction had an infrared absorption spectrum closely similar to that in FIG. 1.

EXAMPLE IV

Propylene was polymerized in a one-gallon stainless steel autoclave provided with a mechanical stirrer and heat-exchange coils. The following materials were charged to the clean, dry reactor while maintaining an atmosphere of prepurified nitrogen.

| Cyclohexane | 2 liters |
| --- | --- |
| Triethylaluminum | 5 milliliters |
| Titanium tetrachloride | 2 milliliters. |

With the reactor and contents at a temperature of 95° F., propylene was gradually charged to the reactor. After 5 minutes, the temperature had increased from 95° to 104° F. and the pressure was recorded as 30 psig. At the end of an additional 17 minutes the temperature had increased to 105° F. and the pressure had increased to 60 psig. The temperature and pressure increased gradually and at the end of an additional period of 3 hours and 8 minutes, the temperature was 162° F. and the pressure was 140 psig. During this period 2.51 pounds of propylene had been charged to the reactor. At this point the charging of propylene was terminated and the reactor and contents were allowed to cool gradually. After one hour and 40 minutes the temperature had decreased to 132° F. and the pressure had decreased to 50 psig. The reaction mixture was then cooled by passing tap water through the heat exchange coils and finally the excess propylene was bled off.

Isopropyl alcohol was added to the reaction mixture to precipitate the polymer. The solid product was washed with additional isopropyl alcohol and finally with methyl alcohol. Polymer was dried in a vacuum oven for approximately 24 hours.

This material was combined with propylene polymer obtained from two additional runs carried out under similar conditions in which a mixture of triethylaluminum and titanium tetrachloride had been employed as the catalyst.

The combined polypropylene (approximately 915 grams) was extracted for approximately one-half hour with 4 liters of normal heptane maintained at its boiling point. This extraction was repeated three additional times using 4 liters of normal heptane for each extraction. The insoluble propylene polymer was dried for 60 hours in a vacuum oven and approximately 152 grams of dry polypropylene were obtained. The soluble portion was recovered by pouring the normal heptane solution into isopropyl alcohol and drying the precipitated material. About 417 grams of polypropylene which was soluble in normal heptane under the conditions of extraction was obtained.

The insoluble polypropylene had the following physical properties:

| Density, grams per cc at room temp. | 0.905 |
| --- | --- |
| Melt index | 0.341 |
| Molecular weight (based on melt index) | 46,600 |
| Inherent viscosity | 3,361 |
| Molecular weight (based on inherent viscosity) | 82,175 |
| Melting point, °F. | 300 |
| Ash content, % | 0.254 |
| Flexibility | Good |
| No strength temperature °F.* | 318 |

*Determined by suspending a 27.5 gm. weight by a standard tensile specimen of the polymer and raising the temperature 5° F./min until the weight drops 1 inch.

The total sample of polypropylene (prior to fractionation) had a melting point of 252±3° F.

The titanium tetrachloride was obtained from Fisher Scientific Co.

The propylene used was Phillips Petroleum Co. pure grade (99 mol percent propylene).

The cyclohexane was Phillips Petroleum Co. commercial grade containing approximately 85 mol percent cyclohexane and this material had been thoroughly dried prior to use.

The triethylaluminum was prepared according to the following general procedure. First, ethyl chloride was reacted with metallic aluminum at approximately 248° to 302° F. to form a mixture of ethylaluminum dichloride and diethylaluminum chloride. This mixture was distilled and the distillate was found to contain 52.7 weight percent chlorine. The mixture was treated in a second step with magnesium and ethyl chloride at about 230° to 248° F. for 6 hours, and for an additional 3-hour period at about 356° F. Thus a major portion of the ethylaluminum dichloride present in the reaction mixture from the first step was converted to diethylaluminum chloride. The reaction mixture from this second step was distilled and the distillate was found to contain 33 weight percent chlorine. (The theoretical for diethylaluminum chloride is 29.4 percent chlorine.) The distillate from the second step was treated with sodium in cetane for 45 minutes at 248° F. and for an additional 4 hours at 320°–356° F. The product was distilled and was found to be substantially pure triethylaluminum. Analysis indicated it contained 0.51 percent chlorine.

Figure 2:
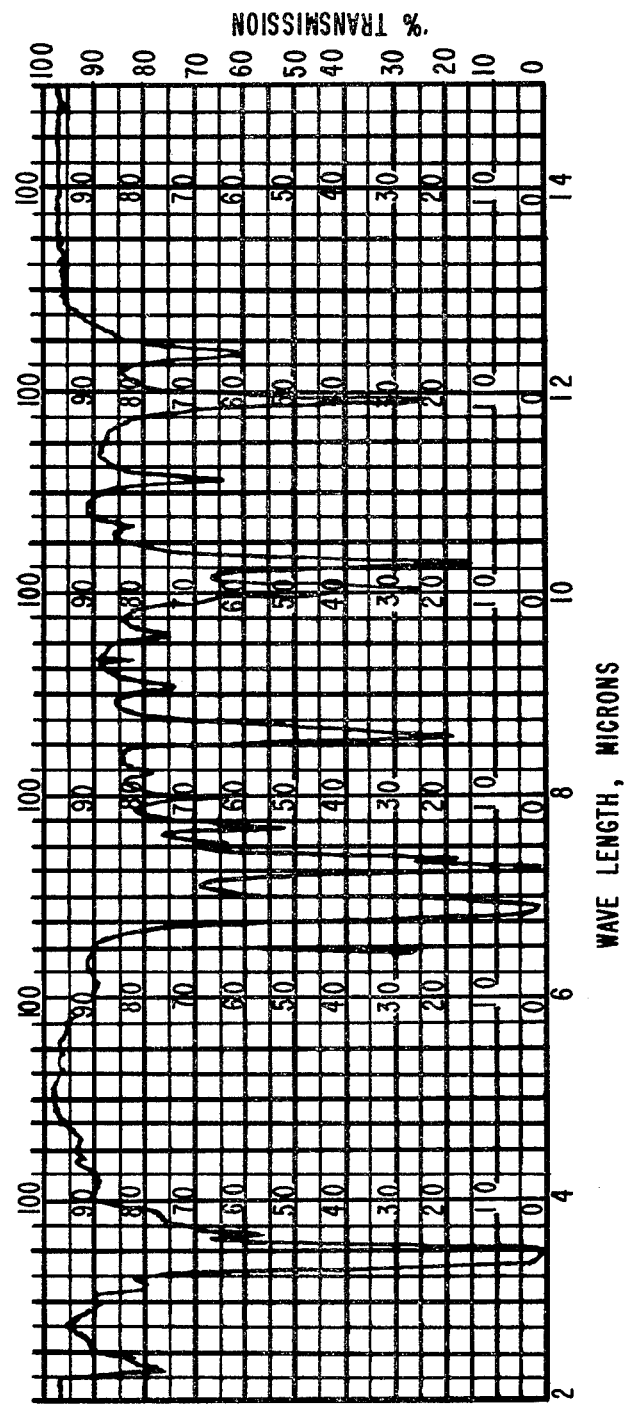
FIG. 2 is a similar spectrum for another polymer according to this invention.

A sample of the insoluble fraction of the polypropylene prepared according to this example was investigated by infrared spectral scanning and by X-ray diffraction. The infrared spectrum is shown in FIG. 2 and it is readily seen that this spectrum is quite similar to that shown in FIG. 1.

Similar results are obtained when the catalyst is a mixture of titanium tetrachloride and lithium aluminum hydride.

Figure 4:
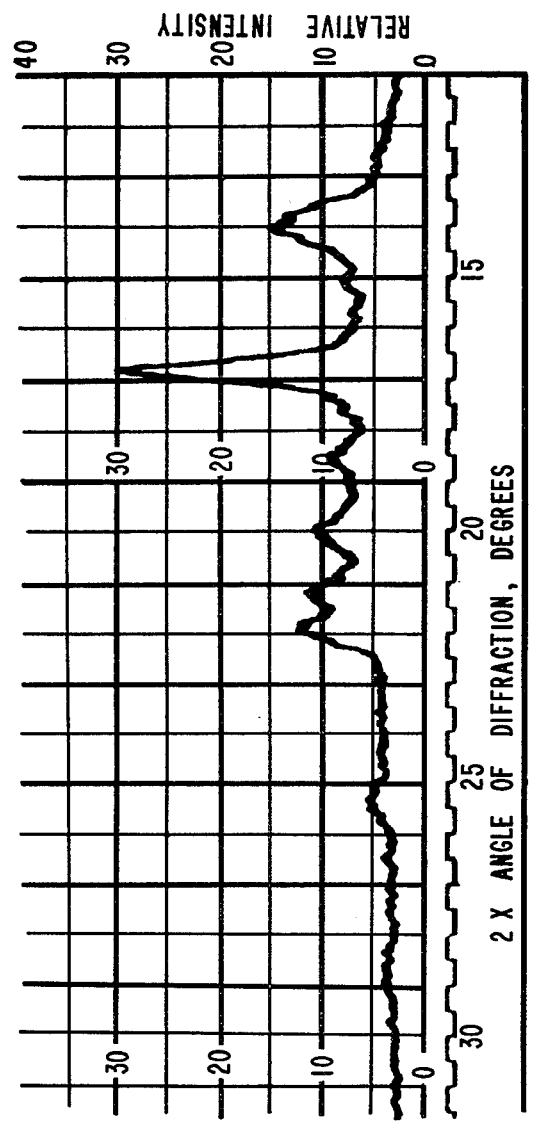
FIG. 4 is an X-ray diffraction pattern for a polymer, the infrared spectrum of which is shown in FIG. 2.

The X-ray diffraction pattern of the above-described insoluble fraction is shown in FIG. 4. This X-ray diffraction pattern, as well as that in FIG. 2, which is similar, indicates a highly crystalline structure, as shown by the definite peaks of intensity of the diffracted X-rays.

The infrared absorption spectra previously described were obtained utilizing a Perkin-Elmer Model 21 spectrophotometer. The samples of polymer used were 60 microns in thickness.

Unless otherwise defined, the term "molecular weight" as used herein means molecular weight as determined by viscosity measurement in the manner previously set forth herein.

The X-ray diffraction patterns were determined with a diffractometer utilizing copper K$\alpha$ radiation and a Geiger counter.

While certain compositions, examples and process steps have been given for purposes of illustration, it is clear that the invention is not limited thereto. It is also clear that we have provided unique crystalline solid polymers of olefins having more than 2 carbon atoms per molecule.

These polymers are characterized by constantly recurring atomic groupings in which the substituent groups (e.g. methyl and other side groups or chains) are oriented in the same general direction.

We claim:

1. Normally solid polypropylene, consisting essentially of recurring polypropylene units, having a substantial crystalline polypropylene content.

* * * * *

UNITED STATES PATENT AND TRADEMARK OFFICE
CERTIFICATE OF CORRECTION

PATENT NO. : 4,376,851
DATED : March 15, 1983
INVENTOR(S) : John P. Hogan; Robert L. Banks It is certified that error appears in the above-identified patent and that said Letters Patent is hereby corrected as shown below:

Column 1, line 51:
    change "ketone" to read
    -- ketone, --

Column 1, line 52:
    change "benzene" to read
    -- benzene, --

Column 9, line 26:
    change "1-Butene" to read
    -- 1-butene --

Column 9, line 30:
    change "394" to read
    -- 394° --

Column 12, line 26 (Claim 1):
    change "polypropylene" to read
    -- propylene --

Signed and Sealed this

Thirtieth Day of August 1983

[SEAL]

Attest:

GERALD J. MOSSINGHOFF

Attesting Officer        Commissioner of Patents and Trademarks